United States Patent
Lindgren et al.

(10) Patent No.: US 6,556,821 B1
(45) Date of Patent: Apr. 29, 2003

(54) METHOD AND APPARATUS RELATING TO WIRELESS OFFICE SYSTEM

(75) Inventors: Magnus Lindgren, Linköping (SE); John Skördeman, Rimforsa (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 393 days.

(21) Appl. No.: 09/609,208

(22) Filed: Jul. 5, 2000

(30) Foreign Application Priority Data

Jul. 6, 1999 (SE) ............................................. 9902605

(51) Int. Cl.[7] ............................................. H04M 11/00
(52) U.S. Cl. ...................... 455/413; 455/417; 455/555
(58) Field of Search ................................ 455/412, 413, 455/414, 415, 422, 575, 417, 445, 461, 555, 554

(56) References Cited

U.S. PATENT DOCUMENTS

| | | | | |
|---|---|---|---|---|
| 5,711,011 A | * | 1/1998 | Urs et al. ................... | 455/413 |
| 5,742,668 A | * | 4/1998 | Pepe et al. .................. | 455/415 |
| 5,742,905 A | | 4/1998 | Pepe et al. .................. | 455/461 |
| 5,802,466 A | * | 9/1998 | Gallant et al. ............... | 455/413 |
| 6,330,436 B1 | * | 12/2001 | Zidel .......................... | 455/412 |

FOREIGN PATENT DOCUMENTS

| | | |
|---|---|---|
| EP | 0 588 576 A2 | 3/1994 |
| WO | WO 98/48560 | 10/1998 |
| WO | PCT SE 99/00995 | 6/2000 |

\* cited by examiner

*Primary Examiner*—Quochien Vuong
(74) *Attorney, Agent, or Firm*—Jenkens & Gilchrist, P.C.

(57) ABSTRACT

The present invention regards method and apparatus relating to wireless office system. The present invention addresses the problem of enabling it to be determined in the wireless office system (5) when voice mail messages for users of mobile stations having subscriptions in the wireless office system (5) are received at the voice mail system (15), the voice mail system (15) being associated with but not included in the wireless office system (5). The duration(s) of greeting message(s) associated with the voice mail system (15) and the or each mobile station having an associated voice mailbox (16b1–16bM) in the voice mail system (15) is/are measured. The connection times to the voice mail system (15) are measured when calls for the mobile stations are forwarded to the voice mail system (15) from the wireless office system (5). By comparing the duration(s) of the greeting message(s) with the measured connection times, it is determined whether voice mail messages have been received.

18 Claims, 4 Drawing Sheets

| fixed phone | long number | short number |
|---|---|---|
| fp1 | +46 13 1234 | 1234 |
| fp2 | +46 13 4567 | 4567 |
| ⋮ | ⋮ | ⋮ |
| fpN | +46 13 8910 | 8910 |

| mobile station | short number |
|---|---|
| ms1 | 9547 |
| ms2 | 6968 |
| ⋮ | ⋮ |
| msM | 1684 |

| mobile station | mobile station number | short number | registered | duration of greeting message | MWI |
|---|---|---|---|---|---|
| ms1 | 070 945899 | 9547 | yes(on) | 6 s | 1 |
| ms2 | 070 568390 | 6968 | yes(off) | 8 s | 3 |
| ..... | ..... | ..... | ..... | ..... | ..... |
| msM | 070 496940 | 1684 | yes(on) | 10 s | 0 |

FIG. 5

METHOD AND APPARATUS RELATING TO WIRELESS OFFICE SYSTEM

TECHNICAL FIELD OF THE INVENTION

The present invention belongs to the field of methods and apparatuses relating to a wireless office system, and in particular to a wireless office system which is associated with a voice mail system providing voice mail services to one or more mobile stations having subscriptions in the wireless office system.

BACKGROUND ART

A PBX (Private Branch Exchange) is a local telephony switching system which interconnects a number of fixed phones, typically in an office or similar. The PBX enables the introduction of a local numbering plan which makes it possible to perform calls between the fixed phones connected to the PBX using local short (4–5 digit) numbers. The marginal costs associated with setting up calls between the fixed phones connected to the PBX is also very low, since connections are set up in the PBX without using an outside telephone network such as a PSTN (Public Switched Telephone Network), i.e. a conventional fixed telephone network.

Furthermore, the PBX is capable of performing various telephone management functions, such as integrating a voice mail system having voice mailboxes associated with the fixed phones connected to the PBX (see for example U.S. Pat. No. 5,561,703; or U.S. Pat. No. 5,388,151). If a call is made to one of the fixed phones connected to the PBX and a subscriber associated with the fixed phone does not answer, then the call is forwarded to the voice mail system, which plays a recorded so called greeting message to a calling party. The greeting message requests the calling party to leave a voice mail message, which will be recorded in a voice mailbox associated with the called fixed phone. When a message has been recorded in the voice mailbox, a small packet of information—a message waiting indicator MWI (also known as a voice mail notification)—is sent from the voice mail system, via the PBX, to the called fixed phone. The MWI normally contains information about the number of the calling party, a voice mail index and, if known, the name of the calling party. The fixed phone is arranged for indicating the receipt of the MWI, for example by flashing a light or by presenting information relating to the MWI on a display. The gain of receiving a MWI is clear, since users of the fixed phones must not continuously check whether they have new voice mail messages in the voice mail system.

Today there is an increasing interest in wireless communications, for example mobile (cellular) telephony or mobile data transfer. So called wireless office systems (WOS) have therefore been developed in order to incorporate mobile stations, e.g. mobile telephones, mobile communicators or mobile computers having radio communication capabilities, into the local numbering plan. The WOS comprises a number of radio nodes, commonly known as radio heads. The radio heads are arranged for performing functions that are similar to the functions performed by radio base stations in a PLMN (Public Land Mobile Network). The radio heads are thus arranged for providing radio communication coverage in different parts of the office (or other location) where the local numbering plan is to be implemented. Mobile stations, when being present in the coverage area of the radio heads, are able to communicate with the radio heads over a radio interface. The WOS further comprises a radio control system, which controls the radio traffic between the mobile stations and the radio heads, and a switching system, which provide the necessary switching functions of the WOS. The WOS is normally connected to the PBX by means of a PRI (primary rate interface). With the WOS, it is therefore possible, using a local short number, to make a call to a mobile station, having a subscription in the WOS, from a fixed phone connected to the PBX or from a mobile station being in the coverage area of the radio heads. It is also possible, using a local short number, to make a call from a mobile station being in the coverage area of the radio heads to one of the fixed phones connected to the PBX. The marginal costs for making these calls are also very low, since the connections are set up in the WOS and, when appropriate, in the PBX. The WOS can also be used on it own without being connected to a PBX.

When a voice mail system is integrated with the PBX, it is not unusual that the voice mail system is also shared with the WOS that is connected with the PBX. One or more mobile stations, having subscriptions in the WOS, will then have associated voice mailboxes in the voice mail system. However, a drawback with having a shared voice mail system is that not all PRIs are able to transfer MWIs, and therefore it is not always possible to send MWIs from the voice mail system to the mobile stations having subscriptions in the WOS.

SUMMARY OF THE INVENTION

The present invention relates to a wireless office system providing wireless communication services to a predetermined number of mobile stations having subscriptions in the wireless office system. One or more of the mobile stations also have associated voice mailboxes in a voice mail system which is associated with but not included in the wireless office system.

The present invention addresses the problem of enabling determination in the wireless office system of when voice mail messages for users of the mobile stations are received at the voice mail system.

In short, the above stated problem is solved according to the following. The duration(s) of greeting message(s) associated with the voice mail system and the or each mobile station having an associated voice mailbox in the voice mail system is/are measured. The connection times to the voice mail system are measured when calls for the mobile stations are forwarded to the voice mail system from the wireless office system. By comparing the duration(s) of the greeting message(s) with the measured connection times, it is determined whether voice mail messages have been received.

The main object of the present invention is thus to enable determination in a wireless office system of when voice mail messages for users of the mobile stations are received at the voice mail system. The present invention includes methods, devices and systems relating to the above stated object.

The above stated problem can be solved more specifically according to exemplifying embodiments of the invention. For example, in one exemplifying embodiment, the wireless office system is connected to a private branch exchange, and the voice mail system is shared between the wireless office system and the private branch exchange.

A main advantage of the present invention, in addition to solving the above stated problem, is that the invention provides the possibility to send message waiting indicators to the mobile stations, even if it is not possible to send message waiting indicators from the voice mail system to the wireless office system.

The invention will now be described in detail using preferred embodiments and referring to the drawings.

BRIEF DESCRIPTION OF THE DRAWINGS

FIG. 5 is a table illustrating information which is stored in the wireless office system.

PREFERRED EMBODIMENTS

Figure 1:
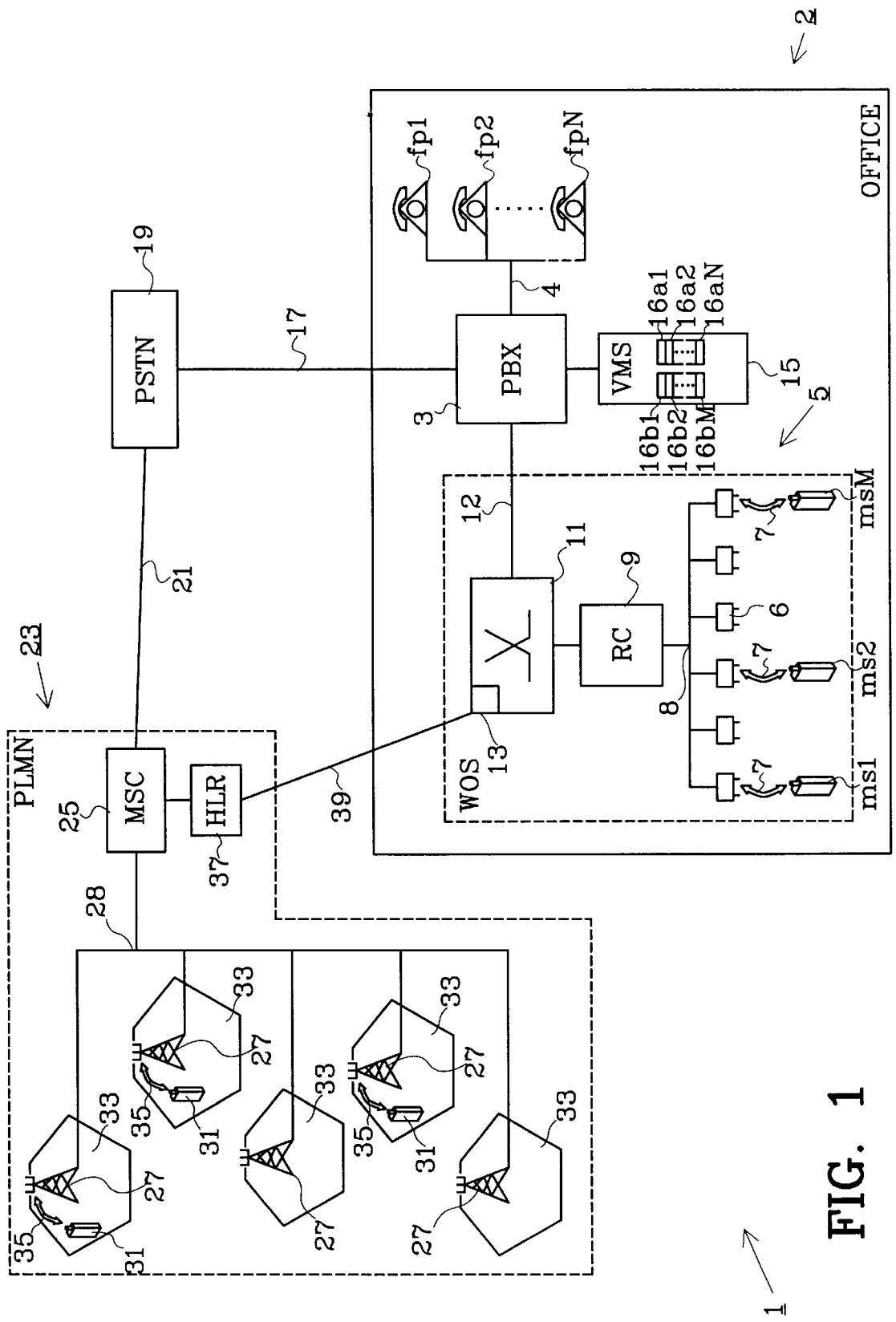
FIG. 1 is a block diagram of a communication system including an office having a private branch exchange and a wireless office system sharing a voice mail system.

In FIG. 1 is shown a block diagram of a communication system 1. The communication system 1 of FIG. 1 includes an office 2 having a PBX 3 and a WOS 5. A number (N) of fixed phones fp1, fp2, . . . , fpN are connected to the to the PBX 3 by means of line connections 4. A voice mail system 15 is also arranged in the office 2 and connected to the PBX 3. The voice mail system 15 includes, in this example, voice mailboxes 16a1, 16a2, . . . , 16aN associated with each one of the fixed phones fp1, fp2, . . . , fpN. The PBX 3 is also connected to a PSTN 19 by means of a first PRI 17. The PSTN 19 is in turn connected, by means of a line connection 21, to a gateway MSC 25 (Mobile services Switching Centre) of a PLMN 23 (Public Land Mobile Network). The PLMN 23 comprises a number of base stations 27, which are connected to the MSC 25 by means of a transport network 28. Each base station 27 is arranged for providing, in a well known manner, wireless communication services, e.g. wireless speech or data communication, to mobile stations 31 in an associated geographical area known as a cell 33. The communications between the mobile stations 31 and the base stations 27 take place over a radio interface 35. The PLMN 23 also comprises a HLR 37 (Home Location Register) connected to the MSC 25. The HLR 37, which is basically a database, is arranged for storing, among other things, information relating to subscriptions in the PLMN 23.

Figures 2, 3, 4:
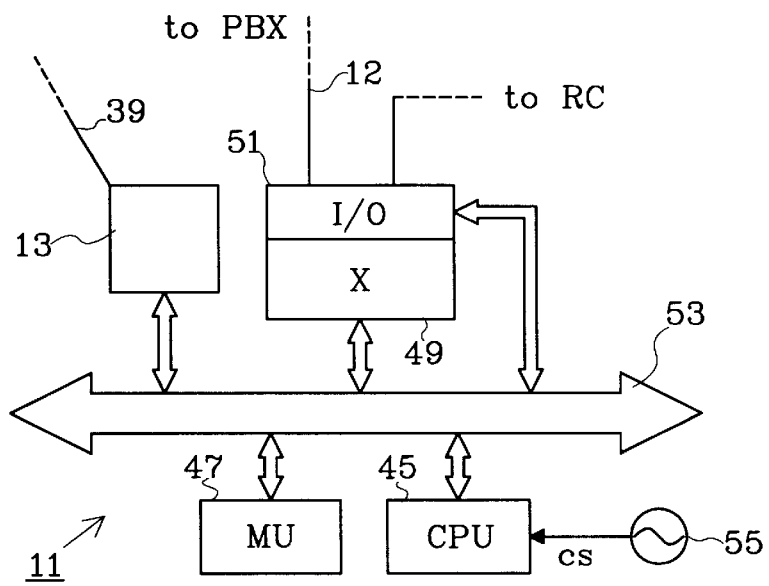
FIG. 2 is a block diagram of a switching system in the wireless office system.
FIG. 3 is a table illustrating information which is stored in the private branch exchange.
FIG. 4 is a table illustrating further information which is stored in the private branch exchange.

In FIG. 3 is shown a table, which illustrates information that is stored in the PBX 3. The PBX 3 is arranged for storing, for each one of the fixed phones fp1, fp2, . . . , fpN, a long calling number and a local short calling number, as illustrated in the second and third column of the table in FIG. 3. As can be seen from the table in FIG. 3, the last digits of the long numbers are the same as the digits in the corresponding short numbers. A call from one of the fixed phones, for example fp1, in the office 2 to another one of the fixed phones, for example fp2, in the office 2 can be made using the associated short number, and the call connection is set up in the PBX 3. If the long number is used instead, as is possible, the call connection will also be set up in the PBX 3. However, if a call is made from outside the office—for example from a fixed phone (not shown) in the PSTN 19 or one of the mobile stations 31 in the PLNM 23—to one of the fixed phones, for example fp1, in the office 2, it is only possible to use the associated long number.

The WOS 5 comprises a number (in this example six) of radio heads 6. A number (M) of mobile stations ms1, ms2, . . . , msM have subscriptions in the WOS 5. In FIG. 1, three of these mobile stations ms1, ms2 and msM are presently in a coverage area of the radio heads 6. Communications between the mobile stations ms1, ms2 and msM and the radio heads 6 take place over a radio interface 7, which is based on an appropriate radio interface standard, for example the TIA (Telecommunications Industry Association) Interim Standard IS-136. In this example, the same radio interface standard is used for communications on the radio interface 35 between mobile stations 31 and the base stations 27 in the PLMN 23 as between the mobile stations ms1, ms2 and msM in the WOS 5 and the radio heads 6. The mobile stations ms1, ms2, . . . , msM that have subscriptions in the WOS 5 also have subscriptions in the PLMN 23. The mobile stations ms1, ms2, . . . , msM can therefore roam between the PLMN 23 and the WOS 5.

The radio heads 6 are, in this example, connected to a radio control system 9 by means of PCM (Pulse Code Modulation) link connections 8. The radio control system 9 is arranged for controlling the radio communications between the mobile stations ms1, ms2, . . . , msM and the radio heads 6. The radio control system 9 controls for example channel selection, hand over functions and transmission power levels. The radio control system 9 is also connected to a switching system 11, which is arranged for performing the switching functions for setting up calls to or from the mobile stations ms1, ms2, . . . , msM that have subscriptions in the WOS 5. The switching system 11 is connected to the PBX 3 by means of a second PRI 12. The first and second PRI 17 and 12 are, in this example, of the same kind, for example 5ESS PRIs by AT&T (American Telephone and Telegraph). The switching system 11 includes a signaling node 13 which is connected to the HLR 37 of the PLMN 23 by means of a signaling connection 39. The signaling connection 39 is in this example based on the ANSI-41 standard, although signaling connections based on other standards, such as TUP (Telephony User Part), can also be used.

The switching system 11 is shown in more detail in FIG. 2. The switching system 11 comprises a physical switching unit 49, a processor unit 45, a memory unit 47 and an I/O-unit 51 (Input/Output). The units 45, 47, 49 and 51 of the switching system 11 are connected by means of a bus system 53. Call connections are set up in the physical switching unit 49, and the operation of the switching system 11 is controlled by the processor unit 45 using computer programmes and data which are stored in the memory unit 47. The I/O-unit 51 is arranged as an interface for connecting the switching system 11 to the second PRI 12 as well as to the radio control system 9. The switching system 11 includes also a system clock 55, which is arranged for generating a clock signal cs which is used as timing reference by the processing unit 45. The signaling node 13 is, in this example, a server computer, which is connected to the signaling connection 39 as well as to the bus system 53.

In FIG. 5 is shown a table, which illustrates information that is stored in the switching system 11. For each one of the mobile stations ms1, ms2, . . . , msM, a mobile station calling number and a local short calling number is stored, as is illustrated in the second and the third column of the table in FIG. 5. Information regarding whether the mobile stations ms1, ms2, . . . , msM are presently registered in the WOS 5 as well as information regarding whether the mobile stations ms1, ms2, . . . , msM are turned on or off is also stored in the switching system 11, as is illustrated in the fourth column of the table in FIG. 5. When a mobile station, for example ms1, with a subscription in the WOS 5, enters the coverage area of the radio heads 6 in the WOS 5, the mobile station ms1 will establish a radio connection with the WOS 5 and register itself in the WOS 5. The switching system 11 will then send a message, over the signaling connection 39, to the HLR 37 indicating that the mobile station ms1 is presently registered in the WOS 5. Information is stored in the HLR 37 regarding which of the mobile stations ms1, ms2, ..., msM are presently registered in the WOS 5.

A call can be made from one of the mobile stations, for example ms1, that are registered in the WOS 5 to another one of mobile stations, for example ms3, that are registered in the WOS 5. The call is set up in the WOS 5, irrespective of whether the call is made using the short number or the mobile station number associated with the called mobile station ms3. A call can also be made from one of the mobile stations, for example ms1, that are registered in the WOS 5 to one of the fixed phones, for example fp2, that are connected to the PBX 3. The call connection is set up in the PBX 3 and in the WOS 5, irrespective of whether the call is made using the long or the short number associated with the called fixed phone fp2. Naturally, a call to one of the mobile stations, for example msM, that are registered in the WOS 5 can also be made from outside the office 2, for example from a fixed phone (not shown) in the PSTN 19 or from one of the mobile stations 31 in the PLMN 23. The call is made using the mobile station number associated with the called mobile station msM.

In FIG. 4 is shown a table, which illustrates further information that is stored in the PBX 3. The PBX 3 is arranged for storing the short calling numbers associated with the mobile stations ms1, ms2, ..., msM that have subscriptions in the WOS 5, as is illustrated in the second column of the table in FIG. 4. A call can therefore be made from one of the fixed phones, for example fpN, to one of the mobile stations, for example ms1, that are registered in the WOS 5. The call can be made using the short number associated with the called mobile station ms1, and the call connection is set up in the PBX 3 and the WOS 5.

The fixed phones fp1, fp2, ..., fpN have associated voice mailboxes 16a1, 16a2, ..., 16aN in the voice mail system 15. If a call, which might originate outside or within the office 2, is made to one of the fixed phones, for example fp1, and the associated user cannot be reached, then in certain cases the call will be forwarded by the PBX 3 to the voice mailbox 16a1 associated with the called fixed phone fp1. Whether or not a call is forwarded to the voice mail 15 system depends on a stored service profile associated with the called fixed phone fp1. If a message is recorded, by a calling party, in the voice mailbox 16a1 associated with the called fixed phone fp1, a MWI is sent from the voice mail system 15, via the PBX 3, to the called fixed phone fp1. The called fixed phone fp1 is arranged for indicating the receipt of the MWI, for example by flashing a light (not shown) or by presenting information relating to the MWI on a display (not shown).

The mobile stations ms1, ms2, ..., msM also have associated voice mailboxes 16b1, 16b2, ..., 16bM in the voice mail system 15. The voice mail system 15 is thus shared between the WOS 5 and the PBX 3. However, in this example, the second PRI 12 does not support the transmission of MWIs. MWIs can therefore not be sent from the voice mail system 15 to the mobile stations ms1, ms2, ..., msM. Instead, the WOS 5 is arranged for determining when voice mail messages for the users of the mobile stations ms1, ms2, ..., msM have been received at the voice mail system 15.

Figure 6:
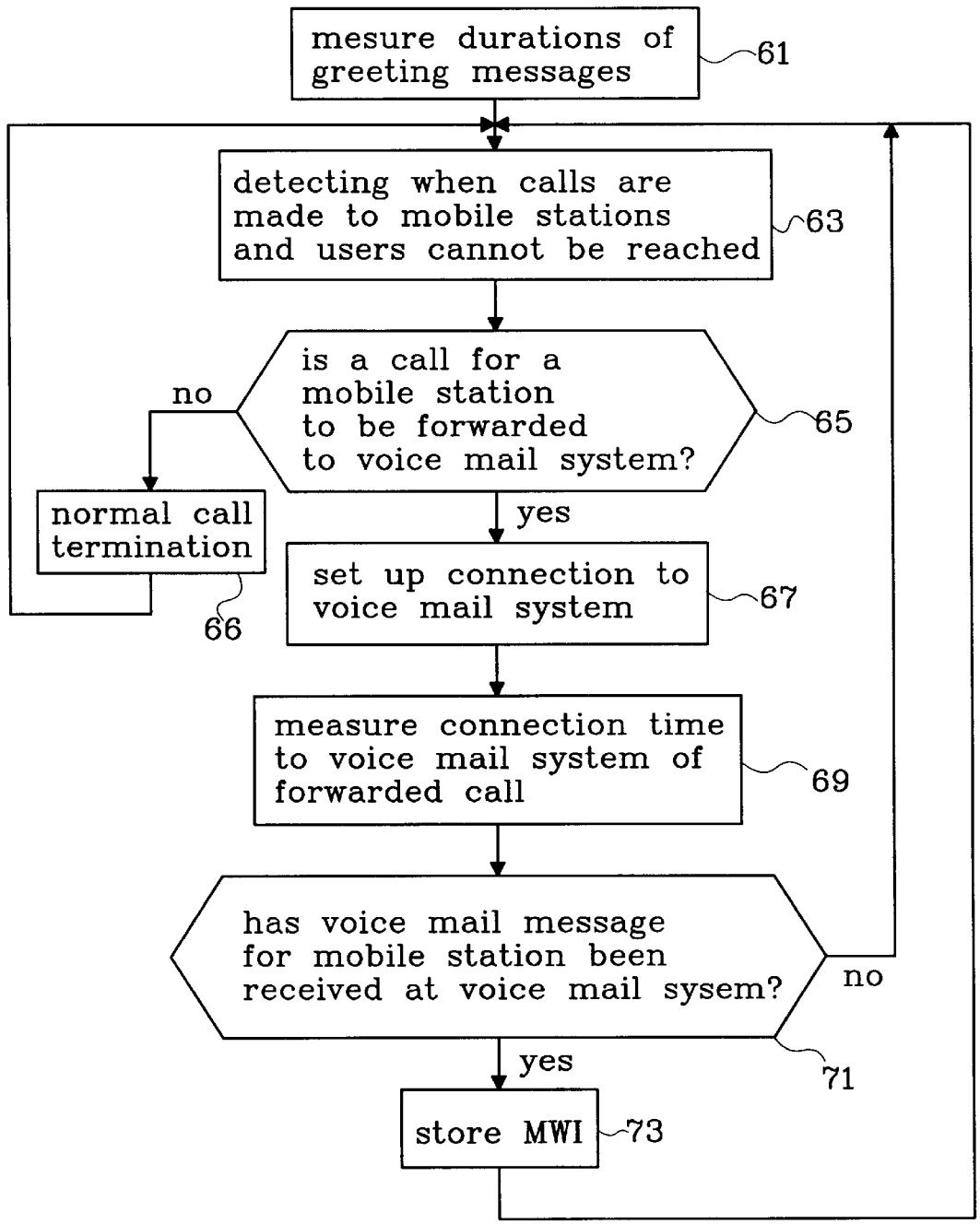
FIG. 6 is a flow chart illustrating a method for determining in the wireless office system whether voice mail messages for mobile stations with subscriptions in the wireless office system have been received at the voice mail system.

In FIG. 6 is shown a flow chart illustrating, as an example, a method of how the WOS 5 is arranged for operating when determining when voice mail messages for the users of the mobile stations ms1, ms2, ..., msM have been received at the voice mail system 15.

The method in FIG. 6 commences with a first step 61, in which the WOS 5 measures the durations of greeting messages associated with the mobile stations ms1, ms2, ..., msM and their respective voice mailboxes 16b1, 16b2, ..., 16bM in the voice mail system 15. In a preferred embodiment, the durations of the greeting messages are measured when the greeting messages are recorded by users of the mobile stations ms1, ms2, ..., msM. The WOS 5 detects when the user of one of the mobile stations ms1, ms2, ..., msM dials an extension to the voice mail system 15 and enters, in a well known manner, a feature code for "recording greeting message". The WOS 5 measures how long time it takes to record the greeting message, and information of the measured duration of the greeting message is stored in the memory unit 47 in the WOS 5, as is illustrated in the fifth column of the table in FIG. 5. The WOS 5 performs an update of the information illustrated in the fifth column of the table in FIG. 5 each time the user of one of the mobile stations ms1, ms2, ..., msM makes a new recording of the associated greeting message.

The method in FIG. 6 continues with a second step 63, in which the WOS 5 continuously detects when calls are being made to the mobile stations ms1, ms2, ..., msM and the users of the called mobile stations ms1, ms2, ..., msM cannot be reached. The reasons why a user of a called mobile station, for example ms1, cannot be reached vary. For example, the user of the called mobile station ms1 might be in a meeting and has therefore programmed the called mobile station ms1, in a well known manner, not to receive any calls, or the called mobile station ms1 is turned off, or the user of the called mobile station simply does not answer.

Upon detecting that the user of a called mobile station, for example ms1, cannot be reached, the method in FIG. 6 continues with a third step 65, in which the WOS 5 determines whether the call for the called mobile stations ms1 is to be forwarded to the voice mail system 15. The WOS 5 checks a stored service profile associated with the called mobile station ms1 in order to determine whether the call should be forwarded to the voice mail system 15. If it is determined that the call is to be forwarded to the voice mail system 15, the method in FIG. 6 continues with a fourth step 67. On the other hand, if it is determined that the call is not to be forwarded to the voice mail system 15, a normal call termination 66 is performed, i.e. the call is terminated when the calling party hangs up. The method in FIG. 6 returns to the second step 63 after the normal call termination 66.

In the fourth step 67 of the method in FIG. 6, the WOS 5 sets up a connection for forwarding the call to the voice mail system 15 via the PBX 3.

The method in FIG. 6 continues, after the fourth step 67, with a fifth step 69, in which a call supervision is performed by the WOS 5 in order to measure a connection time to the voice mail system 15 of the forwarded call.

The method in FIG. 6 continues, after the fifth step 69, with a sixth step 71, in which it is determined whether a new (or first) voice mail message for the user of the called mobile station ms1 has been received at the associated voice mailbox 16b1 in the voice mail system 15. The WOS 5 determines whether a new voice mail has been received by comparing the stored duration of the greeting message, associated with the called mobile station ms1, with the measured connection time. If the duration of the greeting message is greater than or equal to the measured connection time, it is certain that no new voice mail message has been received at the voice mail system 15. If the connection time is just slightly greater than the duration of the greeting message, it is also most likely that no new voice mail message has been received at the voice mail system 15. It is therefore determined that a new voice mail messages has been received at the voice mail system 15 if the connection time exceeds the duration of the greeting message by at least a predetermined (non-negative) value. The predetermined value can be selected in the range from about zero seconds up to about twelve seconds; however, it is preferred that the predetermined value is selected in the range from about two seconds up to about five seconds.

If it is determined in the sixth step 71 that no new voice mail message has been received at the voice mail system 15, the method in FIG. 6 returns to the second step 63, otherwise, the method continues with a seventh step 73. In the seventh step 73 the WOS 5 stores a MWI associated with the called mobile station ms1 (if a MWI associated with the called mobile station ms1 is already stored, then the stored MWI is instead updated to take account of the newly received voice mail message). The WOS 5 is arranged for storing MWIs associated with all the mobile stations ms1, ms2, . . . , msM for which the WOS 5 has determined that voice mail messages have been received at the voice mail system 15, as is illustrated in the sixth column of the table in FIG. 5. The MWIs are, in this example, numbers describing how many voice mail messages, associated with each one of the mobile stations ms1, ms2, . . . , msM, have been received at the voice mail system 15. Alternatively, the MWIs contain also further information, such as information about the lengths the voice mail messages which have been received at the voice mail system 15. After the seventh step 73, the method in FIG. 6 returns to the second step 63.

The memory unit 47 of the switching system 11 is arranged for storing a computer programme which, in conjunction with the processor unit 45, allows the WOS 5 to perform the method in FIG. 6. The time measurements (durations of greeting messages and connection times) are made using the clock signal cs from the clock 55. Alternatively, the WOS 5 comprises other means for performing the method in FIG. 6, be it by hardware components, an additional computer programmed with appropriate software, by any combination of the two or in any other manner.

With the method in FIG. 6, it is determined in the WOS 5 whether voice mail messages for the mobile stations ms1, ms2, . . . , msM have been received at the voice mail system 15. The MWIs that are stored in the WOS 5 are sent to the mobile stations ms1, ms2, . . . , msM, once it has been determined that the mobile stations ms1, ms2, . . . , msM are reachable, i.e. registered in the WOS 5 and switched on. The MWIs are, in a preferred embodiment, sent by using a SMS (Short Message Service). The mobile stations ms1, ms2, . . . , msM indicate the receipt of the MWIs from the WOS 5 in the usual way.

An advantage of the method in FIG. 6 is thus that it allows MWIs to be sent to the mobile stations ms1, ms2, . . . , msM, even when MWIs cannot be transferred over the second PRI 12.

What is claimed is:

1. A method for determining in a wireless office system (5) when voice mail messages, for a user of a mobile station (ms1, ms2, . . . , msM) having a subscription in the wireless office system (5), are received at a voice mail system (15), the method characterised by comprising:

measuring a duration of a greeting message associated with the mobile station (ms1, ms2, . . . , msM) and the voice mail system (15);

measuring a connection time with the voice mail system (15) when a call for the mobile station (ms1, ms2, . . . , msM) has been forwarded from the wireless office system (5) to the voice mail system (15); and determining whether a voice mail message for the mobile station (ms1, ms2, . . . , msM) has been received at the voice mail system (15) by comparing the connection time with the duration of the greeting message.

2. A method according to claim 1, wherein the measuring of the duration of the greeting message includes that the duration of the greeting message is measured when the greeting message is recorded at the voice mail system (15) by a user of the mobile station (ms1, ms2, . . . , msM).

3. A method according to claim 1, wherein the determining of whether a voice mail for the mobile station has been received at the voice mail system (15) includes that it is determined that a voice mail has been received when the connection time exceeds the duration of the greeting message by more than a predetermined value.

4. A method according to claim 3, wherein the predetermined value is zero.

5. A method according to claim 1, wherein the method further comprises:

storing a message waiting indicator (MWI) associated with the mobile station (ms1, ms2, . . . , msM), upon determining that a voice mail message for the mobile station has been received at the voice mail system (15).

6. A method according to claim 5, wherein the method further comprises:

sending the stored message waiting indicator (MWI) to the mobile station (ms1, ms2, . . . , msM), upon determining that the mobile station (ms1, ms2, . . . , msM) is reachable.

7. A method according to claim 6, wherein the sending of the stored message waiting indicator (MWI) includes that the stored message waiting indicator (MWI) is sent by using a short message service.

8. A memory (47), characterised in that the memory is arranged so as to store a computer programme for allowing a wireless office system (5) to perform a method according to claim 1.

9. A wireless office system (5), characterised in that the wireless office system comprises a memory (47) according to claim 8.

10. A system for determining in a wireless office system (5) when voice mail messages, for a user of a mobile station (ms1, ms2, . . . , msM) having a subscription in the wireless office system (5), are received at a voice mail system (15), the system characterised in that it comprises:

means (47,45,55) for measuring a duration of a greeting message associated with the mobile station (ms1, ms2, . . . , msM) and the voice mail system (15);

means (47,45,55) for measuring a connection time with the voice mail system (15) when a call for the mobile station (ms1, ms2, . . . , msM) has been forwarded from the wireless office system (5) to the voice mail system (15); and means (47,45) for determining whether a voice mail message for the mobile station (ms1, ms2, . . . , msM) has been received at the voice mail system (15) by comparing the connection time with the duration of the greeting message.

11. A system according to claim 10, wherein the means (47,45,55) for measuring the duration of the greeting message are arranged for measuring the duration of the greeting message when the greeting message is recorded at the voice mail system (15) by a user of the mobile station (ms1, ms2, . . . , msM).

12. A system according to claim 10, wherein the means (47,45) for determining whether a voice mail message has been received at the voice mail system (15) are arranged for determining that a voice mail has been received when the connection time exceeds the duration of the greeting message by more than a predetermined value.

13. A system according to claim 12, wherein the predetermined value is zero.

14. A system according to claim 10, wherein the system comprises means (47,45) for storing a message waiting indicator (MWI) associated with the mobile station (ms1, ms2, . . . , msM), upon determining that a voice mail message for the mobile station has been received at the voice mail system (15).

15. A system according to claim 14, wherein the system comprises means (11,47,45,9,6) for sending the stored message waiting indicator (MWI) to the mobile station (ms1, ms2, . . . , msM), upon determining that the mobile station (ms1, ms2, . . . , msM) is reachable.

16. A system according to claim 15, wherein the means (11,47,45,9,6) for sending the stored message waiting indicator (MWI) are arranged for sending the message waiting indicator using a short message service.

17. A wireless office system (5), characterised in that the wireless office system comprises a system according to any one of the claims 10 to 16.

18. A communication system, comprising:

a wireless office system (5);

a private branch exchange (3), the private branch exchange being connected to the wireless office system (5); and a voice mail system, the voice mail system being shared between the wireless office system and the private branch exchange, the communication system characterised in:

that the wireless office system (5) comprises a system according to any one of the claims 10 to 16.

* * * * *